US012462996B2

(12) United States Patent
Kroeker et al.

(10) Patent No.: US 12,462,996 B2
(45) Date of Patent: Nov. 4, 2025

(54) HIGH-VOLTAGE RELAY WITH IMPROVED MECHANICAL SHOCK TOLERANCE FOR A DRIVE OR CHARGING CIRCUIT OF AN ELECTRIC VEHICLE WITH A ROCKER AS ARMATURE

(71) Applicant: TE Connectivity Germany GmbH, Bensheim (DE)

(72) Inventors: Matthias Kroeker, Berlin (DE); Peter Sandeck, Berlin (DE); Harry Koch, Berlin (DE); Bernd Rahn, Berlin (DE); Fabian Habur, Berlin (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 17/982,969

(22) Filed: Nov. 8, 2022

(65) Prior Publication Data

US 2023/0148105 A1 May 11, 2023

(30) Foreign Application Priority Data

Nov. 8, 2021 (DE) ........................ 102021129009.0

(51) Int. Cl.
*H01H 51/22* (2006.01)
*H01H 50/24* (2006.01)
*H01H 50/58* (2006.01)

(52) U.S. Cl.
CPC ........ *H01H 51/2281* (2013.01); *H01H 50/24* (2013.01); *H01H 50/58* (2013.01)

(58) Field of Classification Search
CPC ....... H01H 50/18; H01H 50/02; H01H 50/641
See application file for complete search history.

(56) References Cited

U.S. PATENT DOCUMENTS 1,692,486 A * 11/1928 Cohn ..................... H01H 71/40 336/212
3,001,049 A * 9/1961 Didier .................... H01H 51/12 335/181
3,317,871 A * 5/1967 Adams .............. H01H 51/2272 335/230

(Continued)

FOREIGN PATENT DOCUMENTS

CN 108022799 A 5/2018
DE 4039059 A1 6/1992

(Continued)

OTHER PUBLICATIONS

German Office Action, Application No. 102021129009.0, Dated: Jul. 22, 2022, 5 pages.

(Continued)

*Primary Examiner* — Bernard Rojas
(74) *Attorney, Agent, or Firm* — Barley Snyder

(57) ABSTRACT

A high-voltage relay includes a magnetic drive assembly having a first yoke and a second yoke spaced apart from one another, and an armature driven by the magnetic drive assembly. The armature is a rocker having a first arm and a second arm extending away from the first yoke. The armature can be tilted between an open position and a switching position and is mounted on the first yoke. The first arm has a switching contact assembly. A magnetic circuit including the first yoke and the second yoke is closed in the switching position by the second arm.

18 Claims, 4 Drawing Sheets

(56) References Cited

U.S. PATENT DOCUMENTS

| | | | | | |
|---|---|---|---|---|---|
| 3,470,510 | A * | 9/1969 | Richert | H01H 51/01 335/254 |
| 3,745,496 | A * | 7/1973 | Tichy | H01H 50/42 335/230 |
| 4,134,090 | A * | 1/1979 | Schuessler | H01H 51/2272 335/229 |
| 2018/0130625 | A1 | 5/2018 | Kubono et al. | |

FOREIGN PATENT DOCUMENTS

| | | | |
|---|---|---|---|
| EP | 0293199 | A1 | 5/1988 |
| EP | 0843885 | B1 | 7/1996 |
| EP | 2672497 | A1 | 12/2013 |
| EP | 3605580 | A1 | 2/2020 |
| GB | 607038 | A | 8/1948 |
| JP | S48018362 | Y | 5/1973 |
| JP | S48025581 | B | 7/1973 |
| JP | S58103111 | U | 6/1983 |
| JP | 2018073795 | A | 5/2018 |

OTHER PUBLICATIONS

Extended European Search Report from the European Patent Office dated Apr. 5, 2023, corresponding to Application No. 22205575.8-1201, 8 pages.
Japanese Office Action dated Jan. 9, 2024 with English translation, corresponding to Application No. 2022-175962, 6 pages.
Indian Examination Report dated Mar. 1, 2024, corresponding to Application No. 202244062562, 5 pages.
Korean Office Action dated Jun. 21, 2024 with English translation, corresponding to Application No. 10-2022-0147092, 8 pages.

* cited by examiner

HIGH-VOLTAGE RELAY WITH IMPROVED MECHANICAL SHOCK TOLERANCE FOR A DRIVE OR CHARGING CIRCUIT OF AN ELECTRIC VEHICLE WITH A ROCKER AS ARMATURE

CROSS-REFERENCE TO RELATED APPLICATION

This application claims the benefit of the filing date under 35 U.S.C. § 119 (a)-(d) of German Patent Application No. 102021129009.0, filed on Nov. 8, 2021.

FIELD OF THE INVENTION

The invention relates to a high-voltage relay for a drive and/or charging circuit of an electric vehicle.

BACKGROUND

High electrical voltages are typically used in electric vehicles for the drive and charging components. High amperages can also arise during the charging process and during operation of a battery-electric vehicle. Charging stations with voltages of 400 V and 800 V are already widespread. Higher voltages are conceivable in the future. Currents of more than 15 kA can arise briefly during operation. As a result, the drive and charging components of electric vehicles must be able to carry these currents for a short period of time without the contacts opening with high power consumption due to the repulsion effect of the high currents.

Furthermore, the unintentional opening or closing of a circuit due to the high voltages and currents must be reliably prevented. This applies in particular for strong vibrations or shocks, such as can occur while driving an electric vehicle or in the event of an accident.

SUMMARY

A high-voltage relay includes a magnetic drive assembly having a first yoke and a second yoke spaced apart from one another, and an armature driven by the magnetic drive assembly. The armature is a rocker having a first arm and a second arm extending away from the first yoke. The armature can be tilted between an open position and a switching position and is mounted on the first yoke. The first arm has a switching contact assembly. A magnetic circuit including the first yoke and the second yoke is closed in the switching position by the second arm.

BRIEF DESCRIPTION OF THE DRAWINGS

The invention may be understood by reference to the following description taken in conjunction with the accompanying figures, in which reference numerals identify features of the invention.

DETAILED DESCRIPTION OF THE EMBODIMENT(S)

Figure 1:
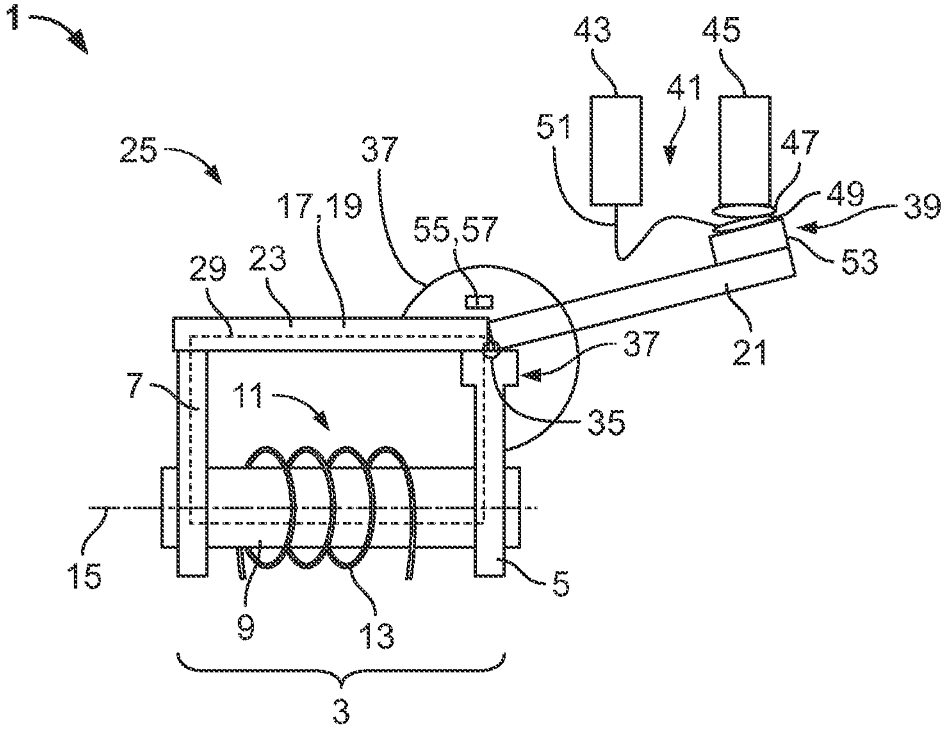
FIG. 1 is a schematic representation of a high-voltage relay according to an embodiment in a switching position.

The invention shall be explained hereafter in more detail by way of example using an advantageous embodiment with reference to the drawings. The combination of features shown by way of example in the embodiment can be supplemented by further features in accordance with the properties of the high-voltage relay according to the invention that are necessary for a specific application. Individual features can also be omitted in the embodiment described where the effect of this feature is irrelevant in a specific case of application. The same reference numerals in the drawings are used for elements having the same function and/or the same structure.

Figure 2:
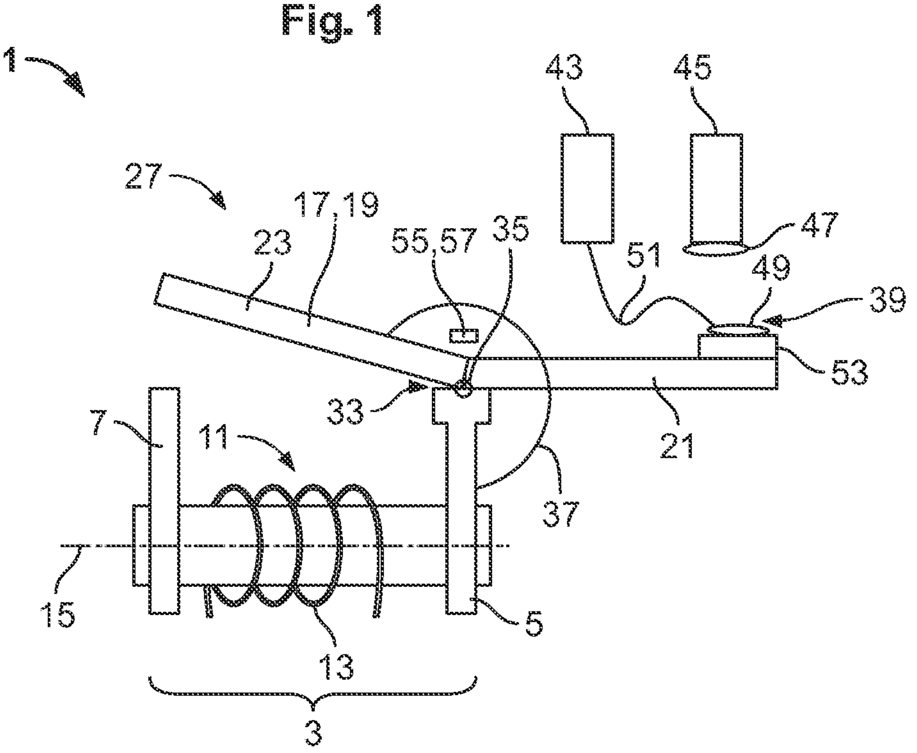
FIG. 2 is a schematic representation of the high-voltage relay of FIG. 1 in an open position.
Figure 3:
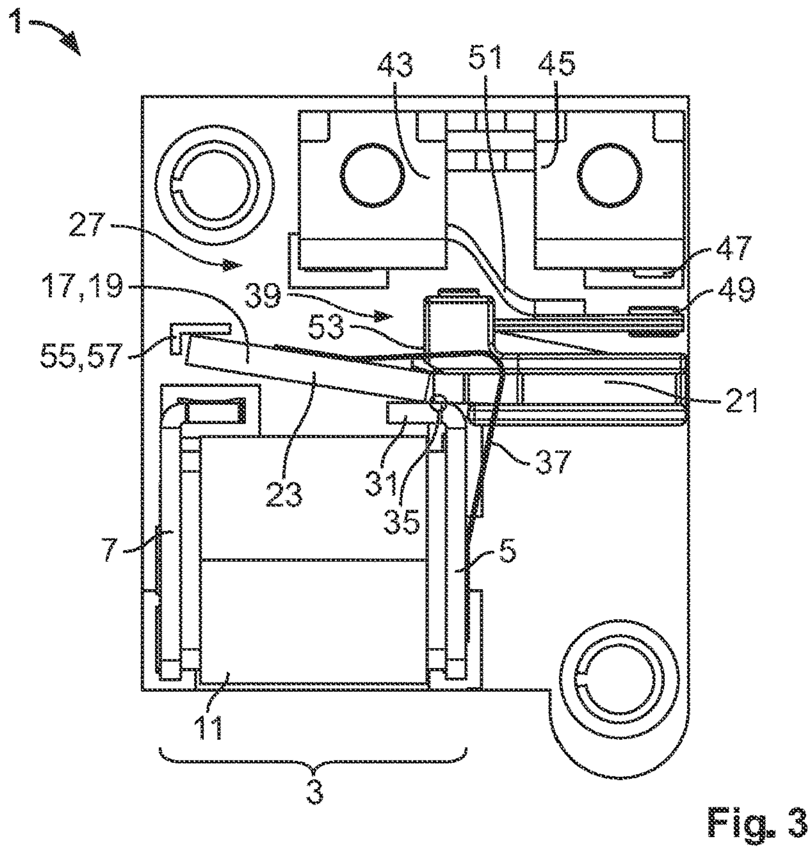
FIG. 3 is a top view of a high-voltage relay according to an embodiment.
Figure 4:
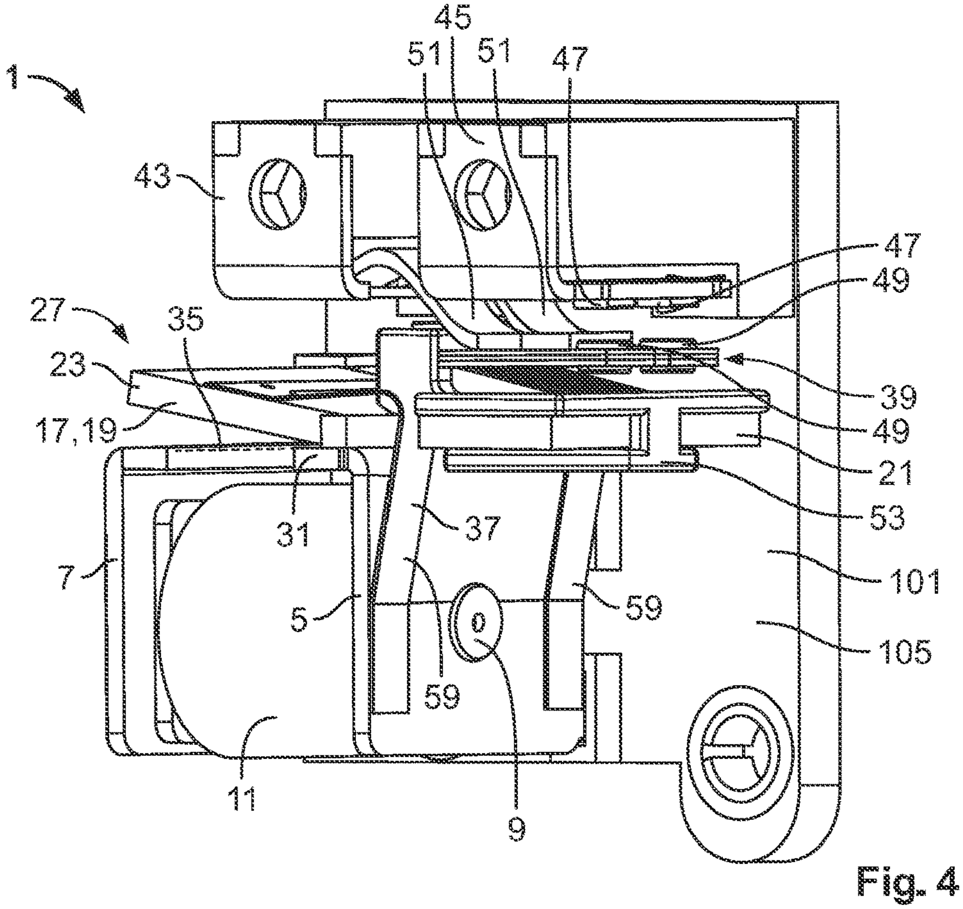
FIG. 4 is a perspective view of the high-voltage relay of FIG. 3.

The basic structure and the function of a high-voltage relay 1 according to the invention shall first be discussed hereafter with reference to FIGS. 1 and 2. The high-voltage relay 1 has a magnetic drive assembly 3. Magnetic drive assembly 3 comprises a core 9 and two yokes, namely a first yoke 5 and a second yoke 7.

The magnetic drive assembly can comprise a coil body 11 with at least one coil turn 13 which extends between two yokes 5 and 7 and around core 9. Coil body 11 is used to generate a magnetic field in core 9. Since coil bodies are known, coil body 11 shall not be discussed further at this point.

The two yokes 5 and 7 and core 9 may be produced from a metallic material, in particular a ferromagnetic material.

As shown in FIGS. 1 and 2, the two yokes 5 and 7 are joined together by core 9 and spaced apart by it. Each of two yokes 5 and 7 extends to be substantially transverse to a longitudinal axis 15 of core 9.

Magnetic drive assembly 3 drives an armature 17 of high-voltage relay 1. Armature 17 is configured as a rocker 19 in the embodiment of FIGS. 1 and 2 and comprises two arms extending away from one another, namely a first arm 21 and a second arm 23.

Armature 17 configured as a rocker 19 is mounted to be tiltable on first yoke 5. Armature 17 can be tilted to and fro between a switching position 25, shown in FIG. 1, and an open position 27, shown in FIG. 2. A load circuit can be closed by high-voltage relay 1 in switching position 25 and open in open position 27. This shall be discussed in detail further below.

The rocker 19 can be configured to be V-shaped. Imaginary extensions of both arms 21, 23 can there enclose acute angles with a longitudinal axis of the core 9. The second arm 23, which closes the magnetic circuit 29 in the switching position 25, is in the switching position 25 disposed parallel to the longitudinal axis 15 of the core 9 on the two yokes 5, 7.

In switching position 25, shown in FIG. 1, a magnetic circuit 29 can be closed by the second arm 23. Magnetic circuit 29 is indicated by dashed lines in FIG. 1. Magnetic circuit 29 can extend through second arm 23, two yokes 5 and 7, and core 9. When magnetic circuit 29 is closed, second arm 23 bears firmly against both yokes 5 and 7. Switching position 25 can be reached by applying a coil current in coil body 11. A magnetic field generated in core 9 then also extends through two yokes 5 and 7 and draws second arm 23 towards yokes 5 and 7. In switching position 25, second arm 23 can be arranged parallel to longitudinal axis 15 of core 9. Second arm 23, in the shown embodiment, has no switching contacts.

First arm 21 projects over magnetic drive unit 3. First arm 21 projects over coil body 11 of magnetic drive assembly 3. First arm 21 there projects beyond the second yoke 7 over first yoke 5. In open position 27, first arm 21 can extend substantially parallel to longitudinal axis 15 of core 9.

In the shown embodiment, armature 17 is configured to roll about first yoke 5 at least during a motion from open position 27 to switching position 25. An even and smooth transition from the open position 27 to the switched position 25 can be achieved by the rolling motion. In addition, an external support or carrying structure to support the armature 17 against the strong magnetic field of the core 9 may be unnecessary. Instead, the armature 17 supports itself on the first yoke 5 as it rolls. As an alternative to this, armature 17 can also be mounted on a suspension, in particular a hinge or a correspondingly configured return spring, to be able to perform the tilt motion.

First yoke 5 can be provided with a bearing 31 for armature 17 at which the cross section of first yoke 5 is enlarged. A sufficiently large contact surface for armature 17 can then be present.

In open position 27 shown in FIG. 2, there is an air gap 33 present between armature 17 and first yoke 5. Instead of an air gap 33, there can also be a layer of lubricant present between armature 17 and first yoke 5. Due to the fact that armature 17 does not bear directly against first yoke 5 in open position 27, magnetic remanence in armature 17 can be prevented.

In order to facilitate the armature 17 rolling along first yoke 5, the armature 17 can be provided with a rounded shape, in particular with a semicircular profile, on its side facing first yoke 5, in particular in the region of a tilt axis 35 of armature 17. Alternatively, first yoke 5 can be provided with a corresponding profile which facilitates the motion of armature 17 on first yoke 5.

In order to move armature 17 from switching position 25 to open position 27 in an automated manner when the coil current in coil body 11 is switched off, armature 17 can be connected to a spring element 37 which generates a spring force in the direction of open position 27. In order to be able to move armature 17 safely to switching position 25 when the coil current is switched on, the spring force of spring element 37 is sufficiently small that it does not block armature 17.

First arm 21 is provided with a switching contact assembly 39, as shown in FIGS. 1 and 2. Switching contact assembly 39 is used to close a load circuit 41, at least a section of a load circuit 41 disposed in high-voltage relay 1. Such a section is indicated in FIG. 1. Load circuit 41 can be in particular a drive and/or charging circuit 41 of an electric vehicle. The second arm 23 is free of a switching contact assembly.

High-voltage relay 1 can comprise two load terminals 43 and 45. Electrical lines of load circuit 41 to be closed can be connected to load terminals 43 and 45. However, they are not part of high-voltage relay 1. Load terminal 45 with a switching contact 47 connected thereto is shown merely by way of example. A second switching contact 49 is part of switching contact assembly 39 of high-voltage relay 1.

Switching contact 49 of switching contact assembly 39 is permanently connected in an electrically conductive manner to load terminal 43. The permanent electrically conductive connection between load terminal 43 and switching contact 49 may be established by way of a flexible electrical conductor 51, as shown in FIGS. 1 and 2. Flexible electrical conductor 51 can be, for example, a stranded wire, a braided cable, or a bundle of thin copper sheets. Alternatively, the flexible electrical conductor 51 can be formed by a resiliently deflectable conductor.

Two switching contacts 47 and 49 bear against one another in switching position 25 shown in FIG. 1, so that an electrically conductive connection is established between two load terminals 43 and 45 via electrical conductor 51 and two switching contacts 47 and 49.

However, the switching contacts 47 and 49 are separated from one another in open position 27 shown in FIG. 2 so that current flow no longer takes place. Switching contact assembly 39 comprises an insulating element 53 by which switching contact 49 of switching contact assembly 39 is electrically insulated from the remainder of armature 17, in particular from second arm 23. In addition, switching contact assembly 39 can comprise at least one contact spring with which the contact pressure of switching contact 49 against switching contact 47 in switching position 25 is ensured.

In order to prevent high-voltage relay 1 from unintentionally closing load circuit 41, or to prevent an unwanted motion of armature 17 from open position 27 to switching position 25, the moments of inertia of both arms 21 and 23 may be substantially equal. The term "equal" is presently to mean that a deviation in the moments of inertia is at most 10%.

A center of gravity of the rocker 19, when viewed along the longitudinal axis 15 of the core 9, is at the height of the tilt axis 35. When viewed along a longitudinal axis 15 of the core 9, the tilt axis 35 is at the height of the first yoke 5.*h*

Since first arm 21 is provided with switching contact assembly 39, material can be removed from arm 21 elsewhere on arm 21 in order to adapt the moment of inertia of first arm 21 to that of second arm 23. As an alternative to this, second arm 23 can be loaded with additional mass in order to adapt the moment of inertia of second arm 23 to that of first arm 21. The same moments of inertia of arms 21 and 23 can lead to vibrations or shocks accelerating both arms 21 and 23 equally, so that there is no unwanted switching from one position to the other.

As shown in FIGS. 1 and 2, high-voltage relay 1 can comprise one or more locking devices 55 configured to prevent armature 17 from moving away from first yoke 5 beyond a predetermined amount. The predetermined amount can be such that armature 17 can move sufficiently far away from first yoke 5 to form air gap 33. Locking device 55, which is only indicated as a small box in FIGS. 1 and 2, can prevent entire armature 17 from being accelerated away from magnetic drive assembly 3 in the event of a strong mechanical shock or vibration. In the simplest case, locking device 55 consists of at least one barrier 57 which is arranged above armature 17 and prevents a motion away from magnetic drive assembly 3.

An embodiment of a high-voltage relay 1 according to the invention shall be described hereafter with reference to FIGS. 3 to 8. The basic structure of high-voltage relay 1 corresponds to high-voltage relay 1 described with reference to FIGS. 1 and 2. For the sake of brevity, only deviations from high-voltage relay 1 previously described or details that have not yet been mentioned shall be described below.

High-voltage relay 1 comprises a spring element 37 which is attached to first yoke 5 and to an upper side of second arm 23. Spring element 37 comprises two arms 59, shown in FIG. 4, which are spaced apart from one another along tilt axis 35 of armature 17 and which are each attached to first yoke 5.

Figure 7:
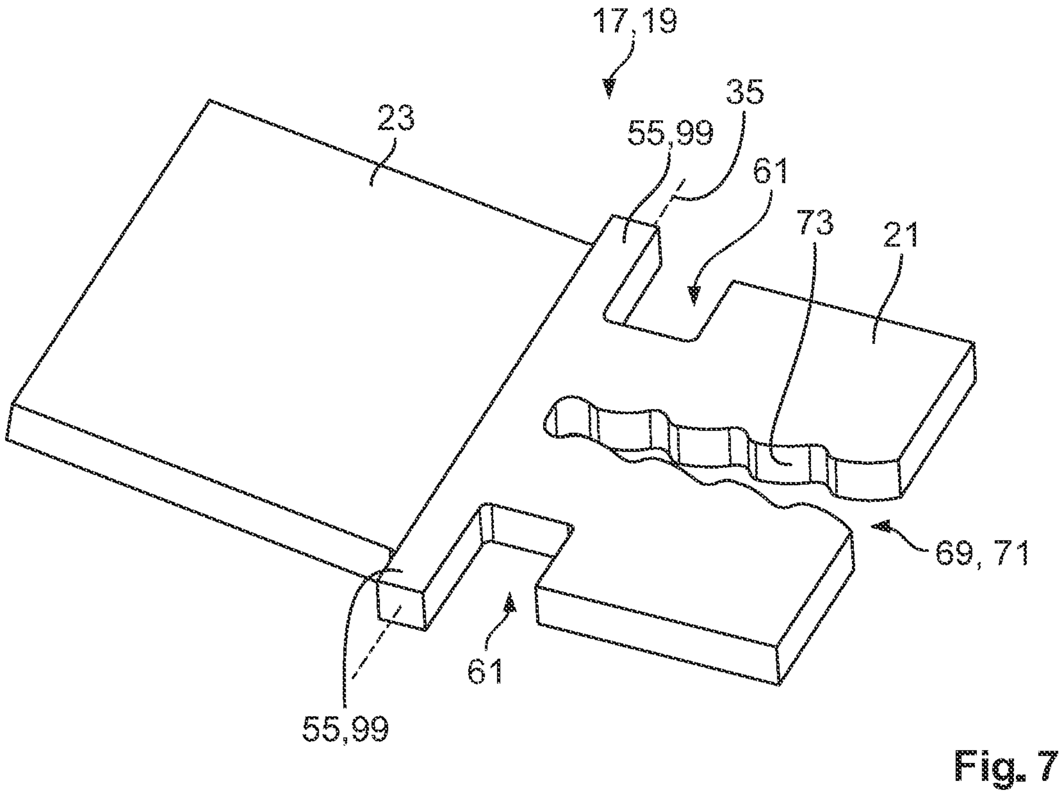
FIG. 7 is a perspective view of an armature of the high-voltage relay of FIG. 3.

A total width along tilt axis 35 of spring element 37 corresponds substantially to the width of armature 17 in the same direction. In order to reach the upper side of armature 17, the armature 17 is therefore provided with two recesses 61 which are disposed opposite one another along tilt axis 35 and extend from the outside into the material of armature 17, as shown in FIG. 7. Arms 59 of spring element 37 can extend through these recesses 61 between the upper side of armature 17 and first yoke 5.

First arm 21 is provided with an embodiment of a switching contact assembly 39. It shall be discussed hereafter with reference to FIGS. 3 to 6. Switching contact assembly 39 comprises insulating element 53 which is produced from plastic material. Insulating element 53 is configured to be attachable to first arm 21. It comprises a base plate 63 which runs parallel to first arm 21 in the assembled state.

Figure 5:
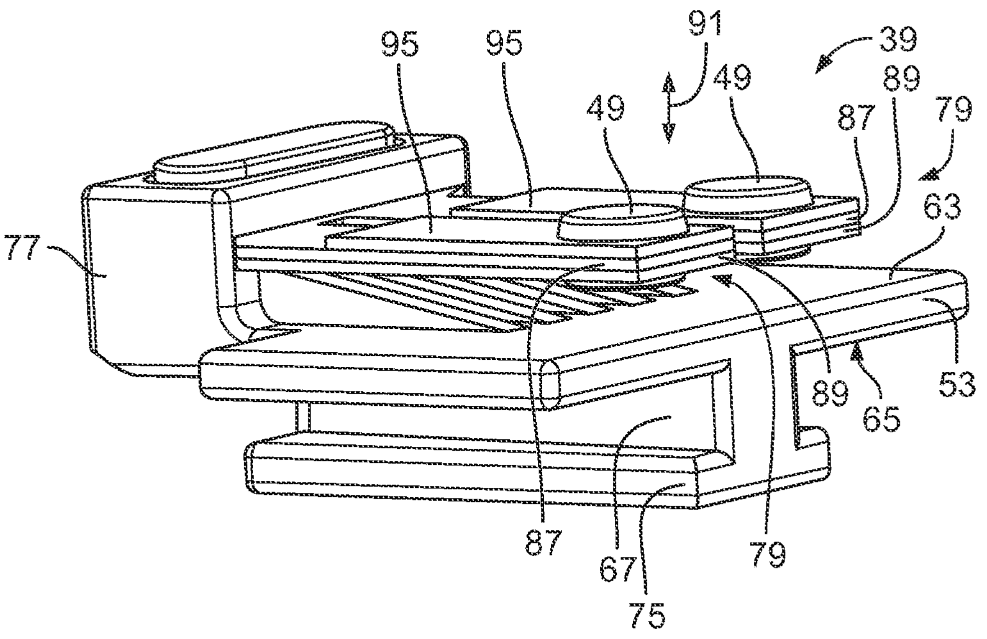
FIG. 5 is a perspective view of a switching contact assembly of the high-voltage relay of FIG. 3.

A web 67 extends on an underside 65 of base plate 63 that faces first arm 21 in the assembled state, as shown in FIG. 5. In the assembled state, web 67 may run parallel to a longitudinal extension of first arm 21. Web 67 can be received in a clamping receptacle 69 in first arm 21 that is configured to be complementary to the former. Clamping receptacle 69, shown in FIG. 7, extends from an end of first arm 21 disposed opposite second arm 23 in the direction toward second arm 23 into the material of armature 17. Web 67 can be pushed into clamping receptacle 69. Due to a retaining structure 71 on inner wall 73 in armature 17 defining clamping receptacle 69, web 67 can be held on first arm 21 in a frictionally-engaged and/or positive-fit manner.

Figure 6:
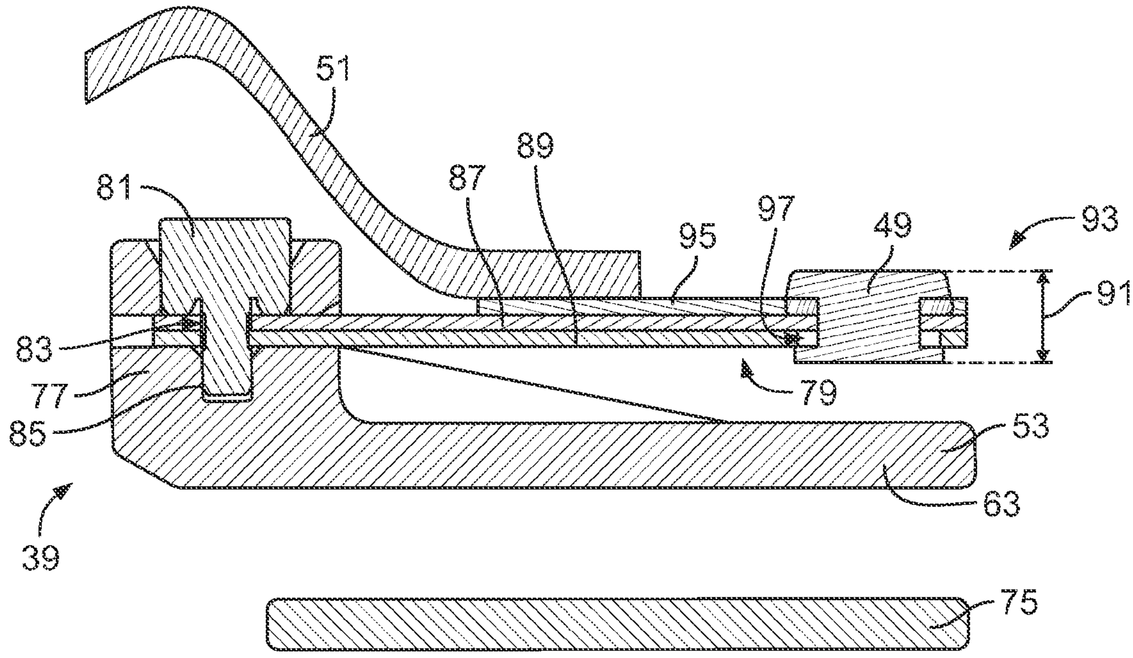
FIG. 6 is a sectional side view of the switching contact assembly of FIG. 5.

A locking plate 75, which runs parallel to base plate 63, extends at one end of web 67 disposed opposite base plate 63, as shown in FIGS. 5 and 6. Locking plate 75 can bear against an underside of first arm 21 so that switching contact assembly 39 is held in a positive-fit manner on first arm 21 also in a direction extending transverse to tilt axis 35 and transverse to the longitudinal extension of first arm 21.

A spring retention structure 77 is arranged on a side of switching contact assembly 39 which in the mounted state on armature 17 is closer to tilt axis 35. Spring retention structure 77 may be formed monolithically with base plate 63.

Two contact springs 79 are held in spring retention structure 77. Each contact spring 79 carries a switching contact 49, as shown in FIG. 5. Contact springs 79 have an overall flat shape and extend parallel to base plate 63, at least in open position 27. Contact springs 79 are spaced from base plate 63.

Contact springs 79 are received in spring retention structure 77. A holding part 81 shown in FIG. 6, for example, a respective holding part 81 for each contact spring 79, extends through a passage opening 83 in contact spring 79 into a receptacle 85 in spring retention structure 77. Holding part 81 can be clamped in receptacle 85. As a result, contact springs 79 are held reliably at the remainder of switching contact assembly 39.

Each contact spring 79 may be formed from several parts. According to an embodiment, each spring retention structure 77 comprises an upper spring plate 87 and a lower spring plate 89. Both spring plates 87 and 89 are formed from spring steel. Upper spring plates 87 and lower spring plates 89 of two contact springs 79 can alternatively each be formed monolithically. This means that an upper spring steel sheet, in particular a U-shaped spring steel sheet, forms the two upper spring plates 87. Correspondingly, a lower spring steel sheet, in particular a U-shaped spring steel sheet, can form the two lower spring plates 89. A single holding part 81 can then be sufficient for attaching the two spring steel sheets to spring retention structure 77.

Since contact springs 79 are intended to be movable along a contacting direction 91 in a resilient manner, two spring plates 87 and 89 may be firmly connected to one another not along their entire length. Instead, they are held to be displaceable relative to one another at least at their end 93 disposed opposite spring retention structure 77. Contacting direction 91 extends to be perpendicular to the plate planes spanned by spring plates 87 and 89.

Upper spring plate 87 is provided with a contact plate 95 on its upper side, as shown in FIG. 6, so that upper spring plate 87 is arranged between contact plate 95 and lower spring plate 89. Contact plate 95 can be firmly connected to upper spring plate 87. However, this is not mandatory. Contact plate 95 may be made of a material that is selected with regard to good electrical conductivity, for example, an alloy containing copper or an alloy containing aluminum.

Each of two contact plates 95 is connected in an electrically conductive manner to one of two flexible electrical conductors 51. For example, each conductor 51 can be welded, soldered, or riveted to associated contact plate 95.

Each switching contact 49 of a contact spring 79 is connected in an electrically conductive manner to contact plate 95 of that contact spring 79. In other words, each contact plate 95 establishes the electrical connection between an electrical conductor 51 and a switching contact 49.

A switching contact 49 extends through contact plate 95 and two spring plates 87 and 89 of its contact spring 79. For switching contact 49 not to prevent spring plates 87 and 89 from moving relative to one another, lower spring plate 89 is provided with a receptacle 97 for switching contact 49, the clear width of which is greater than the diameter of switching contact 49 in the region of lower spring plate 89. This allows switching contact 49 to be movable relative to lower spring plate 89. In contrast, switching contact 49 may be connected in a positive-fit manner to upper spring plate 87.

In switching position 25, switching contact assembly 39 is moved so far from second arm 21 in the direction of switching contacts 47 that switching contacts 49 of switching contact assembly 39 already bear against switching contacts 47 of load terminal 45 before final switching position 25 has been reached. In final switching position 25, first arm 21 with switching contact assembly 39 is moved so far in the direction of switching contacts 47 that contact springs 79 are deflected downwardly, i.e. in the direction towards base plate 63. As a result, a uniformly high contact pressure of switching contacts 49 upon switching contacts 47 can be ensured. The strong contact pressure also makes it possible to prevent very high currents from leading to electromagnetic repulsion of switching contacts 49 from switching contacts 47.

Both switching contacts 47 are there connected to a common load terminal 45, each with a dedicated flexible conductor 51. Due to the division into two switching contacts 47, the amperage per contact can be halved. Halving the amperage per contact has the advantage that the electromagnetic repulsion of the switching contacts 47 from their mating contacts at high currents is reduced. This in turn means that less magnetic attraction of the magnetic drive assembly 3 is required to hold the armature 17 in the switching position 25. This in turn can lead to a lower demand for coil current in the coil body 11.

Figure 8:
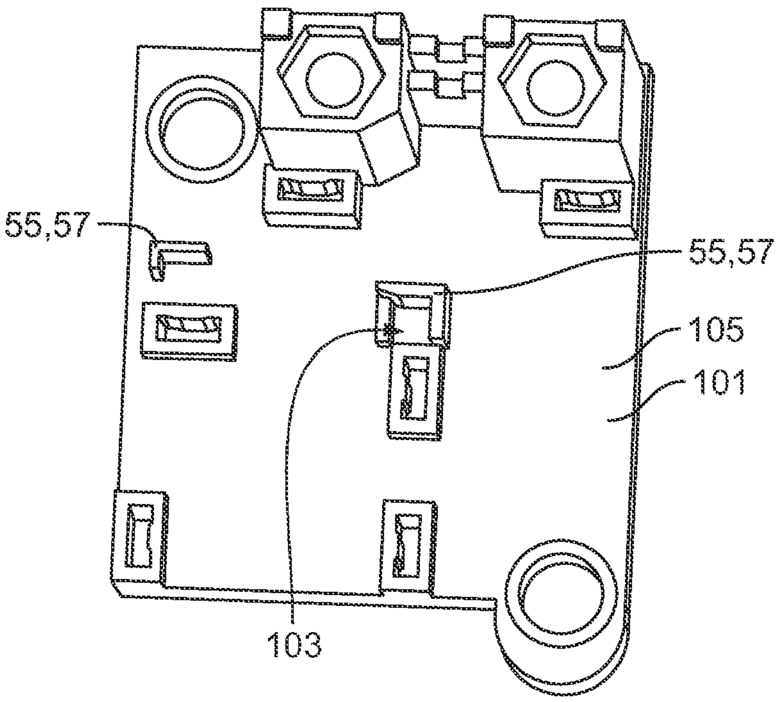
FIG. 8 is a perspective view of a housing lower part of the high-voltage relay of FIG. 3.

The armature 17 is provided with two projections 99, shown in FIG. 7, that are disposed oppositely along tilt axis 35 and that are part of locking device 55. A housing 101 of high-voltage relay 1 is provided with a receptacle 103 for each of projections 99. Only a housing underside 105 of housing 101 with a receptacle 103 for a projection 99 is shown in FIG. 8. Receptacle 103 is defined by a barrier 57 which is part of locking device 55. The barrier 57 prevents second arm 23 from moving away from magnetic drive unit 3 and is likewise part of locking device 55. In this case, second arm 23 can be regarded as a projection of armature 17 which is prevented by barrier 57 from any unwanted motion.

The high-voltage relay 1 for a drive and/or charging circuit of an electric vehicle enables safe operation of an electric vehicle even at high electrical voltages and high amperages and prevents unintentional opening or closing due to the effect of high acceleration (a >50 g) of the circuit connected to the high-voltage relay 1. Due to the configuration as a rocker 19, both arms 21, 23 can be accelerated equally in the event of an external disturbance, for example an impact. The forces on both arms 21, 23 can then cancel each other out. This can prevent unintentional switching to the switching position 25 or to the open position 27. The relay 1 is therefore impact resistant.

Due to the fact that both arms 21, 23 perform different tasks, safety can also be increased because the second arm 23 can be associated only with closing the magnetic circuit, while the first arm 21 is responsible for switching the switching contacts 47, 49 of the high-voltage relay 1. Due to the configuration as a rocker 19, a spatial separation can be effected. Since the rocker 19 is mounted at, in particular, on the first one of the two yokes 5, 7, it can be drawn with its tilt axis 35 toward the first yoke 5 and supported thereon when the magnetic circuit is closed. At the same time, the second arm 23 closes the magnetic circuit by bearing against the second yoke 7. High mechanical stability of the high-voltage relay 1 is achieved by this arrangement. The high-voltage relay 1 according to the invention can be used for the typical charging voltages of <1000 V and beyond. In addition, it can carry currents of up to 15 kA for a short period of time, wherein the short period of time denotes a period of less than 2 ms.

The high-voltage relay 1 can be configured in particular to hold the respective switching position without switching over unintentionally, even in the event of impacts of up to 90 g. "g" stands for the gravitational acceleration of 9.81 $m/s^2$. The impact resistance can be obtained in particular by the armature 17 being configured as a rocker 19.

What is claimed is:

1. A high-voltage relay, comprising:

a magnetic drive assembly having a first yoke and a second yoke spaced apart from one another;

an armature driven by the magnetic drive assembly, the armature is a rocker having a first arm and a second arm extending away from the first yoke, the armature can be tilted between an open position and a switching position and is mounted on the first yoke, the first arm has a switching contact assembly that is spaced apart from a first load terminal of the high-voltage relay in the open position and is in contact with the first load terminal of the high-voltage relay in the switching position, the switching contact assembly has a switching contact and an insulating element insulating the switching contact from the second arm, the insulating element has a base plate with a web, a magnetic circuit including the first yoke and the second yoke is closed in the switching position by the second arm extending between and contacting the first yoke and the second yoke; and a locking device limiting an amount of rotation of the armature away from the first yoke to a predetermined amount of rotation.

2. The high-voltage relay of claim 1, wherein the first arm projects over the magnetic drive assembly.

3. The high-voltage relay of claim 1, wherein a moment of inertia of the first arm is relation to a tilt axis of the rocker is equal to a moment of inertia of the second arm in relation to the tilt axis.

4. The high-voltage relay of claim 1, wherein the armature rolls about the first yoke from the open position to the switching position.

5. The high-voltage relay of claim 1, wherein the switching contact is permanently connected in an electrically conductive manner to a second load terminal of the high-voltage relay.

6. The high-voltage relay of claim 5, wherein the switching contact is connected to the second load terminal by a flexible electrical conductor.

7. The high-voltage relay of claim 5, wherein the switching contact assembly has a pair of switching contacts each permanently connected to the second load terminal.

8. The high-voltage relay of claim 1, further comprising a housing.

9. The high-voltage relay of claim 8, wherein the locking device has a projection on the armature.

10. The high-voltage relay of claim 9, wherein the housing has a barrier against which the projection bears.

11. The high-voltage relay of claim 1, further comprising a spring element attached to the first yoke and the second arm.

12. The high-voltage relay of claim 11, wherein the spring element generates a spring force in a direction of the open position.

13. The high-voltage relay of claim 1, wherein the magnetic drive assembly includes a core and a coil body disposed around the core, the coil body extends between the first yoke and the second yoke.

14. The high-voltage relay of claim 1, wherein the first arm has a clamping receptacle receiving the web.

15. A high-voltage relay, comprising:

a magnetic drive assembly having a first yoke and a second yoke spaced apart from one another; and an armature driven by the magnetic drive assembly, the armature is a rocker having a first arm and a second arm extending away from the first yoke, the armature can be tilted between an open position and a switching position and is mounted on the first yoke, the first arm has a switching contact assembly that is spaced apart from a first load terminal of the high-voltage relay in the open position and is in contact with the first load terminal of the high-voltage relay in the switching position, the switching contact assembly has a switching contact and an insulating element insulating the switching contact from the first arm, the insulating element has a base plate with a web that is received in a clamping receptacle of the first arm to attach the insulating element to the first arm, a magnetic circuit including the first yoke and the second yoke is closed in the switching position by the second arm extending between and contacting the first yoke and the second yoke.

16. The high-voltage relay of claim 15, wherein the clamping receptacle extends from an end of the first arm opposite the second arm in a direction toward the second arm and into a material of the armature.

17. The high-voltage relay of claim 16, wherein the armature has a retaining structure on an inner wall defining the clamping receptacle, the retaining structure frictionally engages the web when the web is inserted into the clamping receptacle.

18. The high-voltage relay of claim 15, wherein the insulating element has a locking plate parallel to the base plate and attached to the base plate by the web, the locking plate bears against an underside of the first arm to hold the switching contact assembly on the first arm.

* * * * *